(12) United States Patent
Yoshida et al.

(10) Patent No.: US 12,253,488 B2
(45) Date of Patent: *Mar. 18, 2025

(54) GAS SENSOR

(71) Applicant: NGK INSULATORS, LTD., Aichi (JP)

(72) Inventors: Soichiro Yoshida, Nagoya (JP);
Kunihiko Nakagaki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 425 days.

This patent is subject to a terminal disclaimer.

(21) Appl. No.: 17/213,775

(22) Filed: Mar. 26, 2021

(65) Prior Publication Data

US 2021/0302356 A1  Sep. 30, 2021

(30) Foreign Application Priority Data

Mar. 31, 2020 (JP) .................................. 2020-064109

(51) Int. Cl.
*G01N 27/407* (2006.01)
*G01N 27/409* (2006.01)
*G01N 27/41* (2006.01)

(52) U.S. Cl.
CPC ..... *G01N 27/4071* (2013.01); *G01N 27/4072* (2013.01); *G01N 27/409* (2013.01); *G01N 27/41* (2013.01)

(58) Field of Classification Search
CPC ..... G01N 27/406; G01N 27/407–4072; G01N 27/4077; G01N 27/41
See application file for complete search history.

(56) References Cited

U.S. PATENT DOCUMENTS

| 6,401,522 | B1* | 6/2002 | Kon | G01N 27/419 204/426 |
| 2001/0000598 | A1* | 5/2001 | Miyata | G01N 27/4074 204/426 |
| 2006/0137979 | A1* | 6/2006 | Strassner | G01N 27/4075 204/431 |
| 2006/0219554 | A1 | 10/2006 | Mori et al. | |

(Continued)

FOREIGN PATENT DOCUMENTS

| JP | 4623760 B2 | 2/2011 |
| JP | 2016-109642 A | 6/2016 |

OTHER PUBLICATIONS

Song et al., Thermophysical and mechanical properties of cubic, tetragonal and monoclinic ZrO2, Journal of Materials Research and Technology, vol. 23, pp. 648-655 (2023) (Year: 2023).*

*Primary Examiner* — James Lin
*Assistant Examiner* — Vivian A Tran
(74) *Attorney, Agent, or Firm* — MATTINGLY & MALUR, PC

(57) ABSTRACT

A gas sensor includes a laminated body constituted by at least two ceramic layers laminated thereon, and having at least one gas introduction port, and at least one internal vacancy, and an outer side electrode formed on the laminated body, and provided in order to discharge oxygen from the internal vacancy, wherein a slit portion connected to an external space, and which is formed in the laminated body in covering relation to the outer side electrode, is interposed between the ceramic layers and the outer side electrode.

9 Claims, 8 Drawing Sheets

(56) References Cited

U.S. PATENT DOCUMENTS

| | | | |
|---|---|---|---|
| 2007/0000780 A1* | 1/2007 | Oya | G01N 27/419 |
| | | | 204/424 |
| 2008/0035480 A1* | 2/2008 | Cramer | G01N 27/4071 |
| | | | 204/424 |
| 2014/0060012 A1* | 3/2014 | Kakimoto | G01N 27/4074 |
| | | | 60/277 |
| 2016/0282298 A1* | 9/2016 | Hino | G01N 27/409 |
| 2016/0282299 A1* | 9/2016 | Hino | G01N 27/41 |
| 2016/0356196 A1* | 12/2016 | Nakano | F01N 9/00 |

* cited by examiner

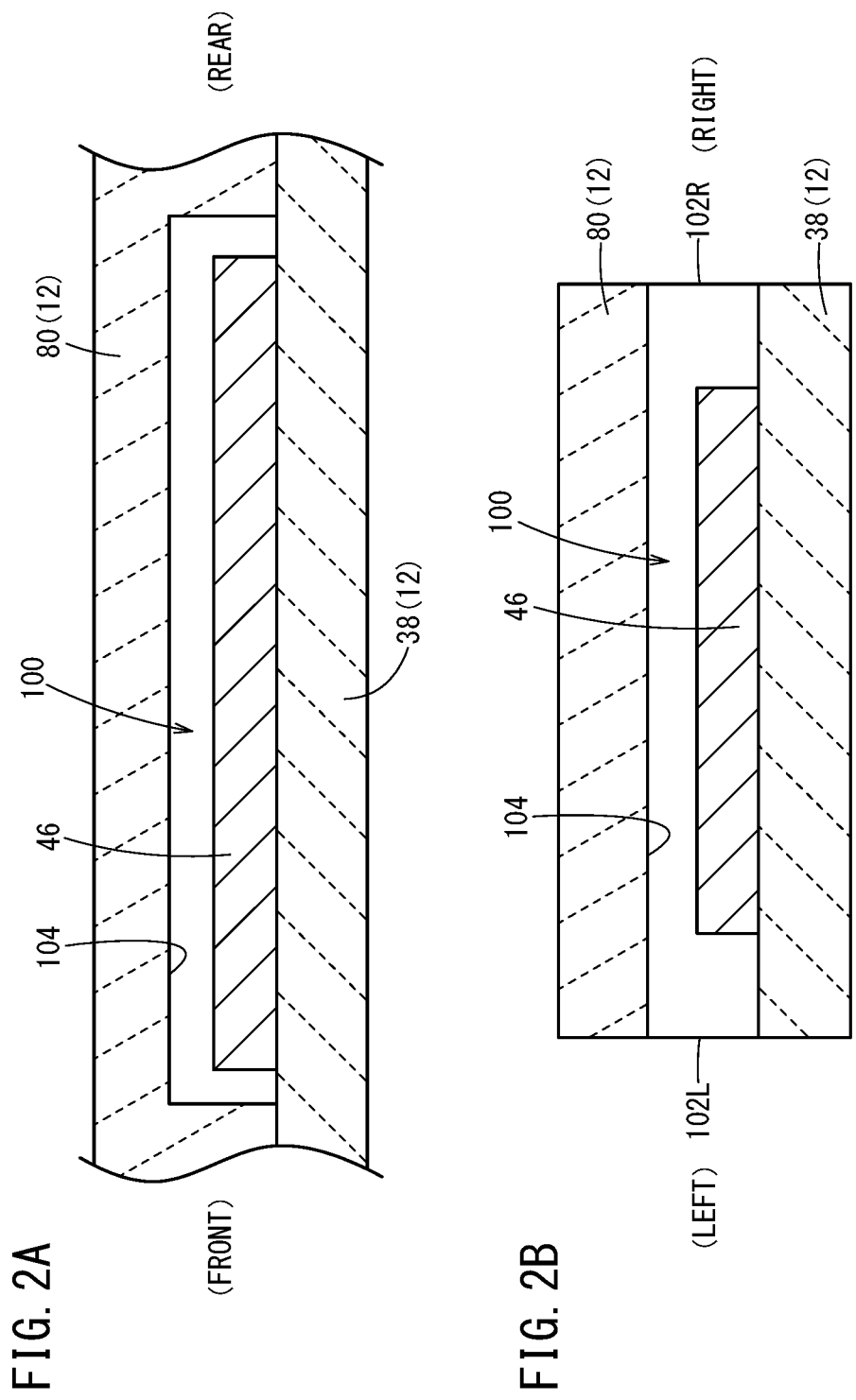

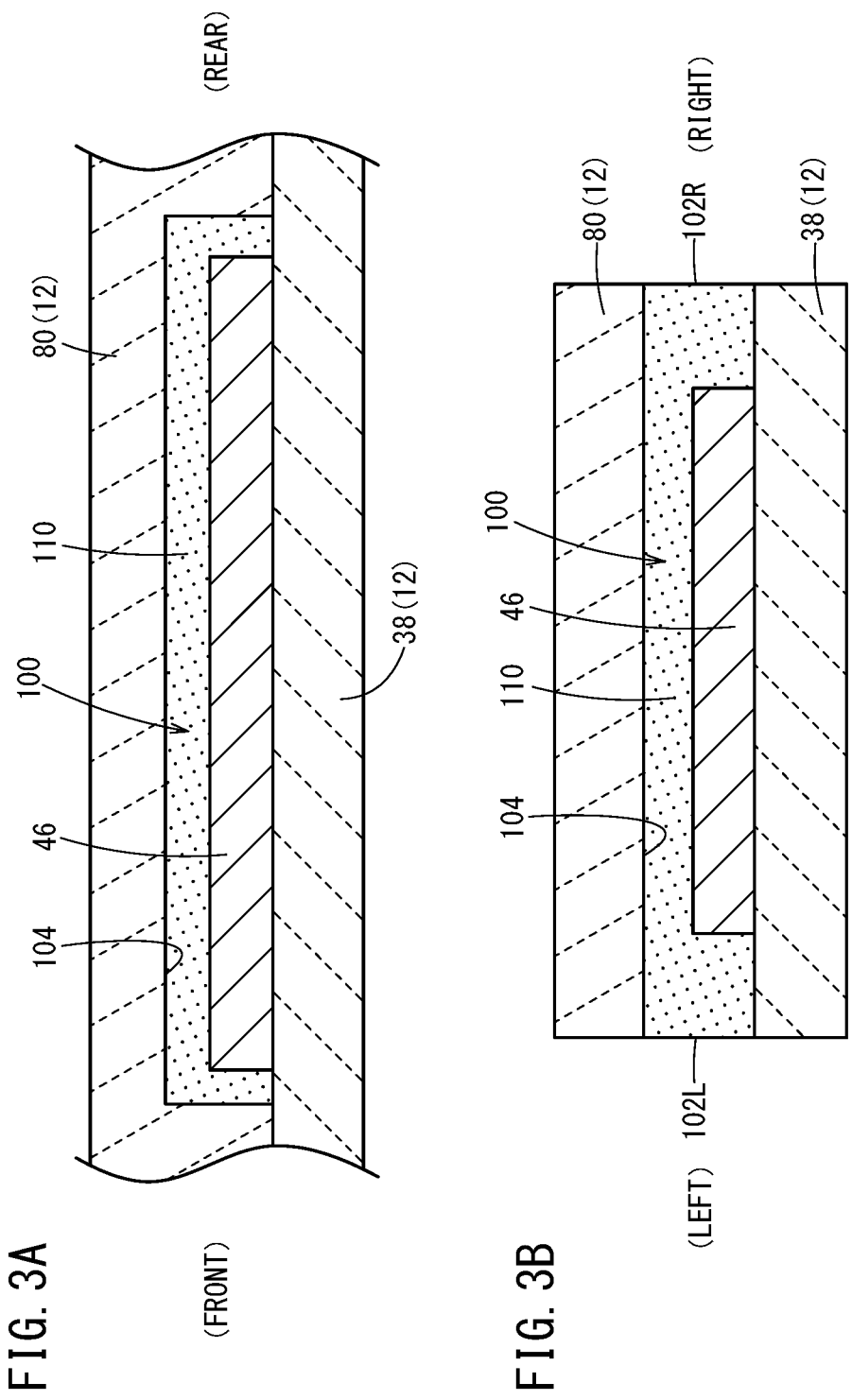

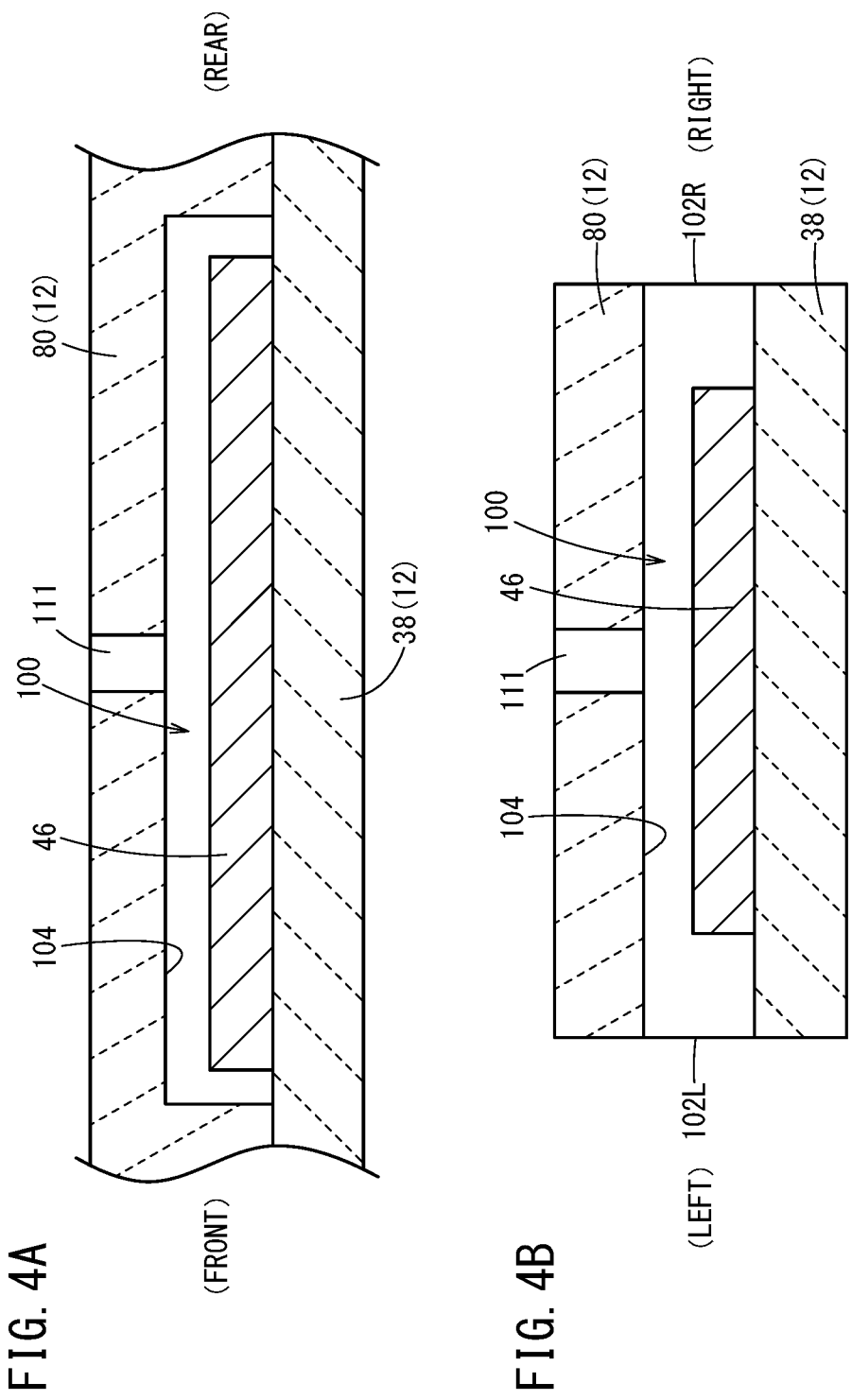

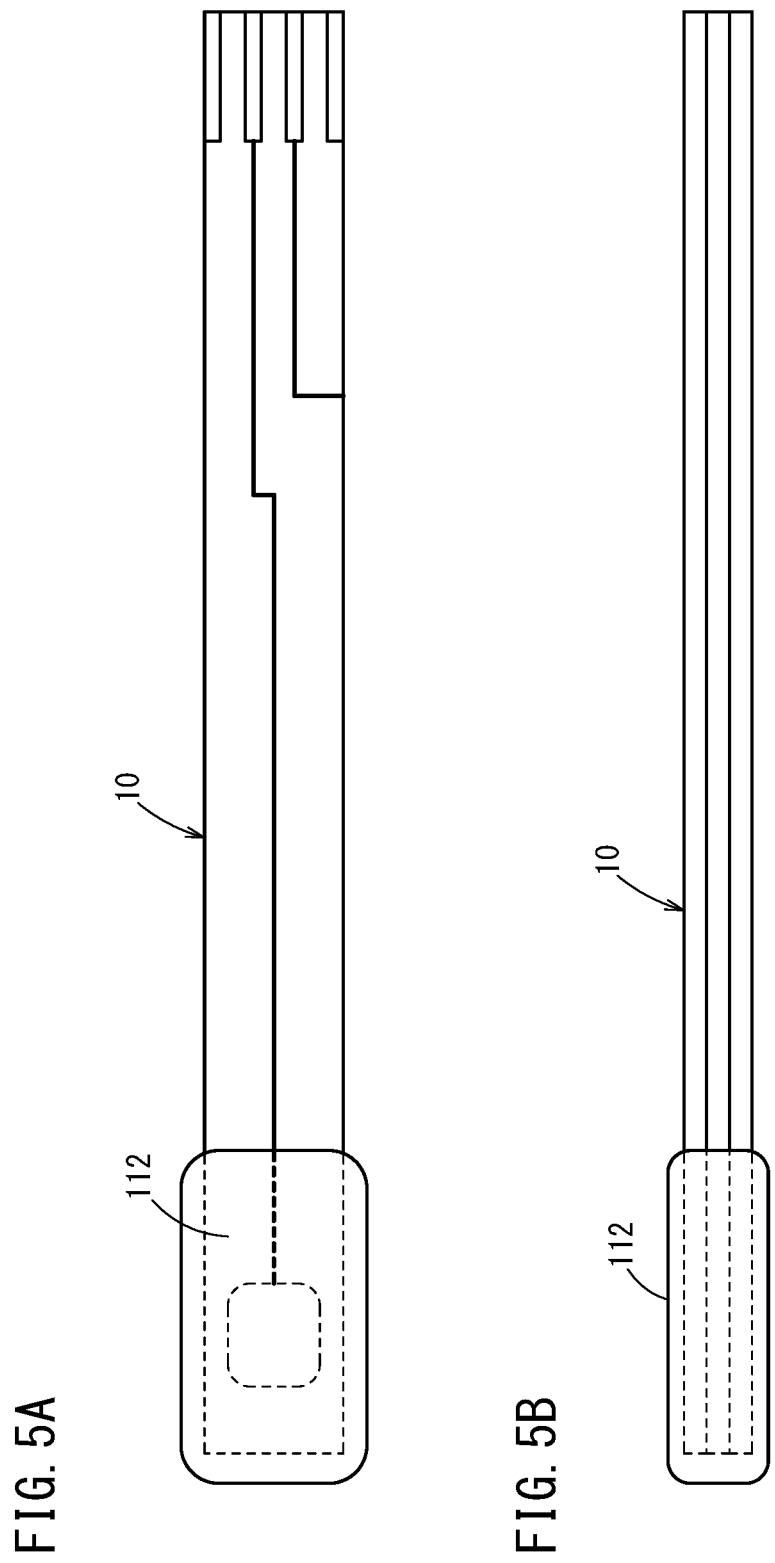

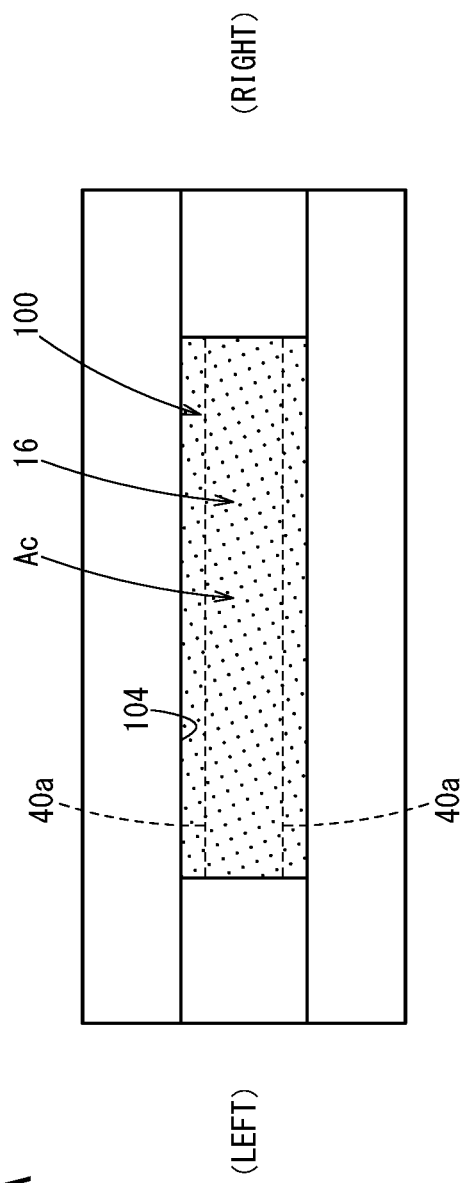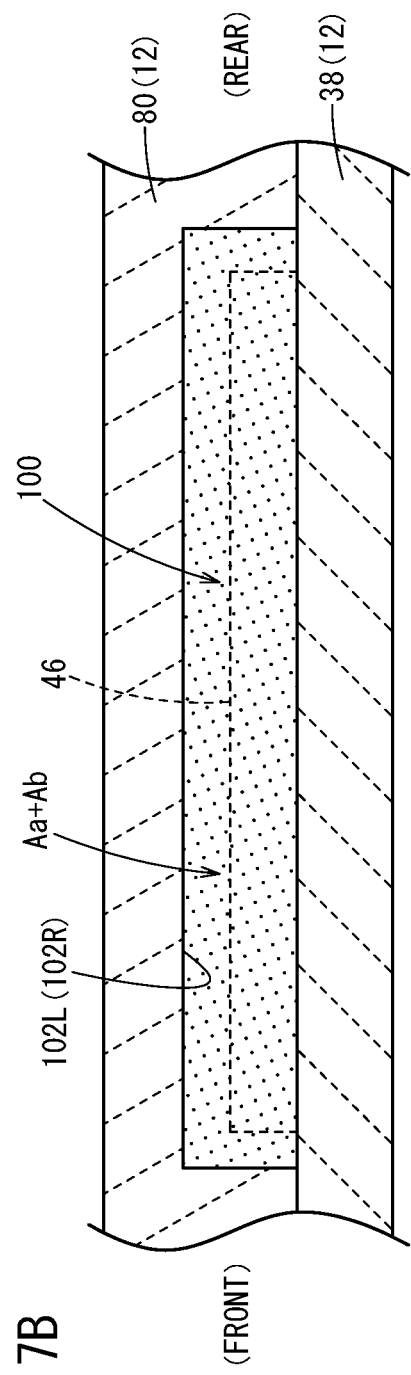
FIG. 7A
FIG. 7B

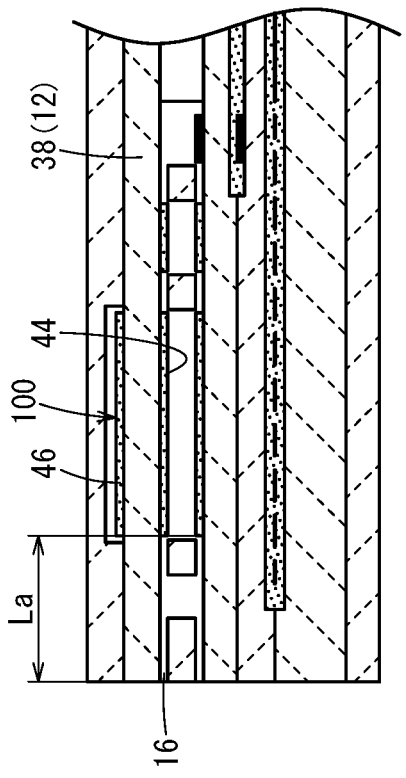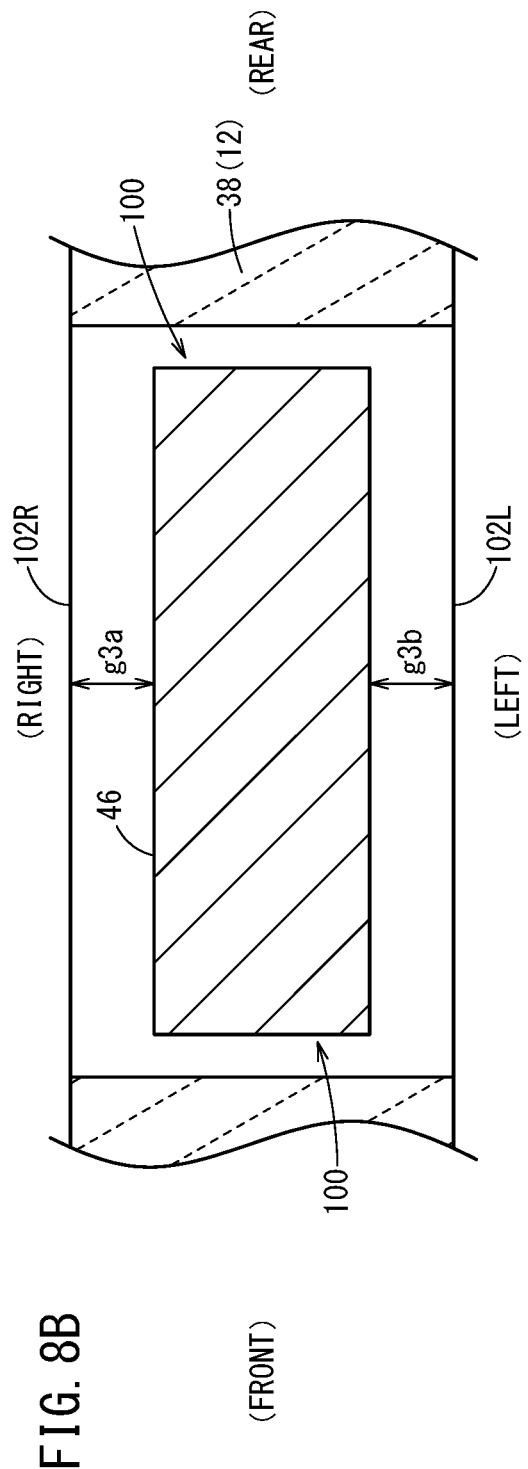
FIG. 8A
FIG. 8B

GAS SENSOR

REFERENCE TO RELATED APPLICATION

This application is based upon and claims the benefit of priority from Japanese Patent Application No. 2020-064109 filed on Mar. 31, 2020, the contents of which are incorporated herein by reference.

BACKGROUND OF THE INVENTION

Field of the Invention

The present invention relates to a gas sensor in which a ceramic laminated body is used.

Description of the Related Art

With a structure as in the conventional art, in which an oxygen outlet electrode for discharging (pumping out) oxygen is arranged on an element surface, cracks due to contact with water, and characteristic abnormalities due to poisoning of exhaust gas components are known to occur. Therefore, recently, in order to protect the oxygen discharge outlet electrode, a structure has been adopted in which the oxygen discharge outlet electrode is embedded in the element.

In the sensor element disclosed in Japanese Patent No. 4623760, a dense layer which is impermeable to gas is laminated on the surface of the solid electrolyte layer in a manner so as to sandwich an electrode. A substantially rectangular through hole surrounding the electrode is provided on a distal end side of the dense layer, and a porous layer is embedded in the through hole. In accordance with such features, the gas is capable of flowing in and out between the electrode and the exterior through the porous layer.

However, stresses tend to be concentrated on corner portions of the through hole, and stresses tend to be concentrated from the corner portions to the dense layer when a thermal shock due to coming into contact with water or the like is applied thereto. Further, when a thermal shock due to coming into contact with water is applied, a problem results in that cracks easily occur within the dense layer.

Thus, as disclosed in Japanese Laid-Open Patent Publication No. 2016-109642, a second electrode is filled, and at least a portion of a side surface of an electrode portion is exposed to the exterior of the gas sensor element as an exposed portion, and the electrode portion itself possesses gas permeability. In accordance with such features, it becomes unnecessary to provide a through hole in the gas impermeable dense layer that directly covers the second electrode, or to embed a porous body that is permeable to the gas, and the strength of the gas sensor element can be enhanced.

SUMMARY OF THE INVENTION

However, in the gas sensor element disclosed in Japanese Laid-Open Patent Publication No. 2016-109642, since the electrode is directly exposed to the external atmosphere, there is a concern that the electrode may become poisoned by components contained within an exhaust gas under an exhaust gas environment in which the sensor is installed. Further, by expanding a width of the electrode to the side surface, the amount of precious metal that is used increases, and the cost of the gas sensor element itself increases.

Further, when a non-combusted substance flows into a vacant chamber from the gas introduction port, in order to cause the non-combusted component to undergo combustion, there is a need for oxygen to be pumped in, by applying a voltage conversely from the oxygen discharge outlet electrode to the inner side electrode which is disposed inside the vacant chamber. In the case of the structure disclosed in Japanese Laid-Open Patent Publication No. 2016-109642, the region of the oxygen discharge outlet electrode is filled with the porous oxygen discharge outlet electrode, and the diffusion resistance is large, and therefore, cases may occur in which oxygen for causing the non-combusted substance to undergo consumption cannot be sufficiently pumped in. Thus, when a voltage is applied to forcibly pump in the oxygen, there is a concern that damage may occur to the element.

The present invention has been devised taking into consideration the aforementioned problems, and has the object of providing a gas sensor, which is capable of solving the aforementioned problems of a conventional gas sensor element, together with being capable of efficiently discharging oxygen from an electrode, in a structure in which solid electrolyte layers having different main components are laminated.

The gas sensor according to one aspect of the present invention includes a laminated body constituted by at least two ceramic layers laminated thereon, and having at least one gas introduction port, and at least one internal vacancy, and an outer side electrode formed on the laminated body, and provided in order to discharge oxygen from the internal vacancy, wherein a slit portion connected to an external space, and which is formed in the laminated body in covering relation to the outer side electrode, is interposed between the ceramic layers and the outer side electrode.

In accordance with such a configuration, the slit portion, which is an external space, constitutes an oxygen pumping out section, and therefore, oxygen can be efficiently discharged from the outer side electrode, while in addition, the occurrence of cracks or the like due to the pressure of the oxygen that is pumped from the internal vacancy can be suppressed. Further, since the slit portion connected to the external space is interposed between the ceramic layer and the outer side electrode, due to the diffusion resistance of the slit portion, the possibility of the outer side electrode becoming poisoned by exhaust gas can be suppressed.

Further, as discussed previously, since oxygen can be efficiently discharged and pumped in from the outer side electrode, the oxygen is easily pumped in to the vacant chamber from the outer side electrode, and for example, in the case that a non-combusted substance flows into the vacant chamber from the gas introduction port, such a non-combusted substance can be made to undergo combustion. More specifically, the gas sensor of the present invention also serves as a countermeasure against the problems of the gas sensor element disclosed in Japanese Laid-Open Patent Publication No. 2016-109642.

In accordance with the gas sensor according to the present invention, in such a structure in which the ceramic layers are laminated, oxygen can be efficiently discharged and pumped in from the outer side electrode.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2A is a vertical cross-sectional view sectioned in a front-rear direction and showing a slit portion and a structure surrounding a periphery thereof;

FIG. 2B is a vertical cross-sectional view sectioned in a left-right direction and showing the same features;

FIG. 3A is a vertical cross-sectional view sectioned in a front-rear direction and showing a second exemplary configuration of the gas sensor;

FIG. 3B is a vertical cross-sectional view sectioned in a left-right direction and showing the same features;

FIG. 4A is a vertical cross-sectional view sectioned in a front-rear direction and showing a third exemplary configuration of the gas sensor;

FIG. 4B is a vertical cross-sectional view sectioned in a left-right direction and showing the same features;

FIG. 5A is a plan view showing a fourth exemplary configuration of the gas sensor;

FIG. 5B is a side view of the fourth exemplary configuration;

FIG. 7A is a front view showing the vicinity of a gas introduction port of the gas sensor;

FIG. 7B is a vertical cross-sectional view sectioned in a front-rear direction and showing a slit portion and a structure surrounding a periphery thereof;

FIG. 8A is a vertical cross-sectional view for describing a shortest distance from a gas introduction port to a distal end of an oxygen concentration adjustment chamber; and FIG. 8B is a vertical cross-sectional view sectioned in a front-rear direction and showing a slit portion and a structure surrounding a periphery thereof.

DESCRIPTION OF THE PREFERRED EMBODIMENTS

Exemplary embodiments of a gas sensor according to the present invention will be presented and described in detail below with reference to FIGS. 1 to 8B.

Figure 1:
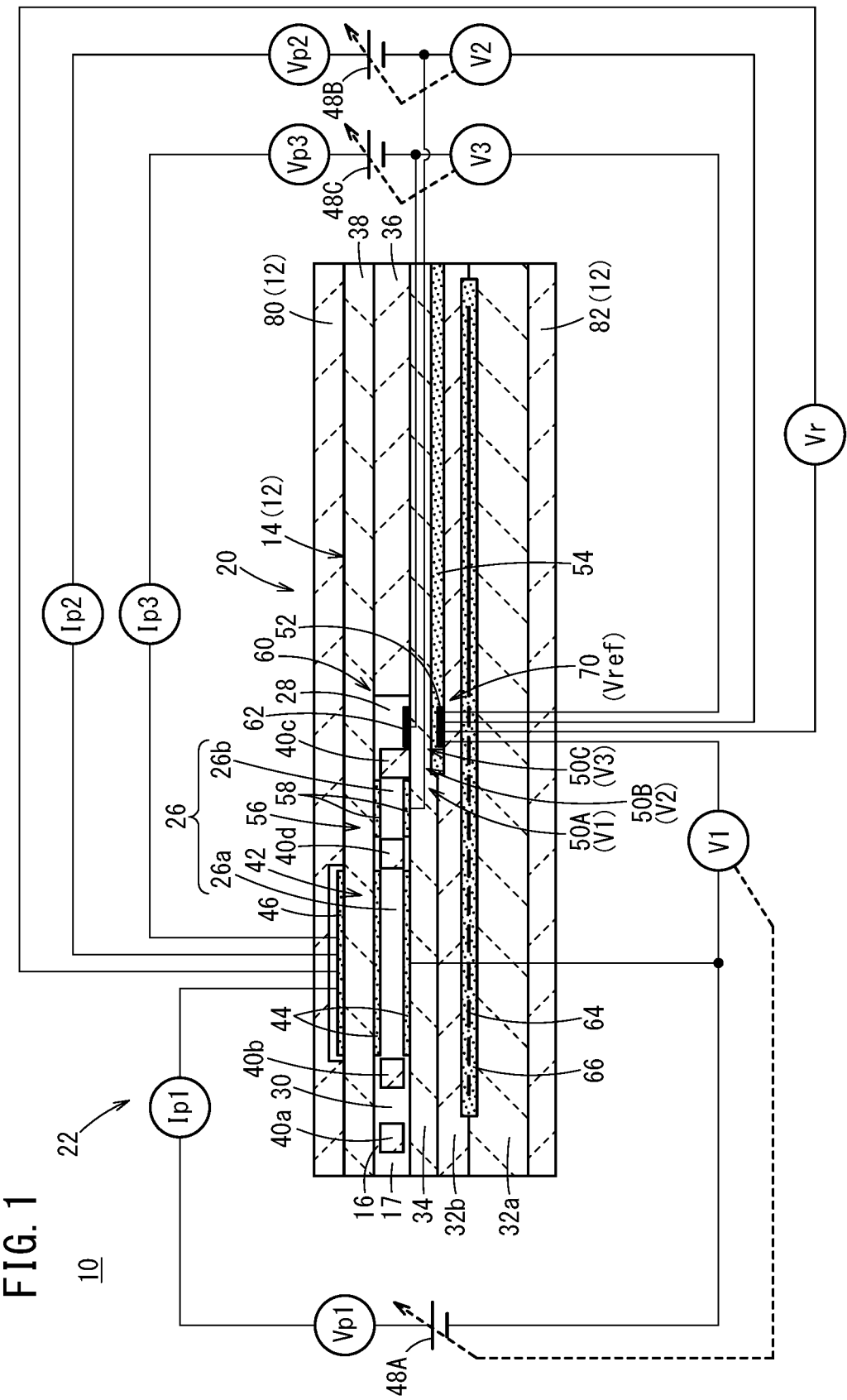
FIG. 1 is an explanatory view in which there is shown a vertical cross section and functions of a gas sensor according to a present embodiment.

As shown in FIG. 1, a gas sensor 10 according to the present embodiment includes a sensor element 20. The sensor element 20 includes a laminated body 14 (structural body) constituted by ceramic layers 12 made up from an oxygen ion conductive solid electrolyte, and a sensor cell 22 formed in the laminated body 14.

The sensor cell 22 includes a gas introduction port 16 formed in the laminated body 14 and into which a gas to be measured is introduced, an oxygen concentration adjustment chamber 26 formed in the laminated body 14 and communicating with the gas introduction port 16, and a measurement chamber 28 formed in the laminated body 14 and communicating with the oxygen concentration adjustment chamber 26. A preliminary space 17 is formed in front of the gas introduction port 16, and the gas to be measured is introduced into the sensor cell 22 via the preliminary space 17 and the gas introduction port 16.

The oxygen concentration adjustment chamber 26 includes a main adjustment chamber 26a communicating with the gas introduction port 16, and an auxiliary adjustment chamber 26b communicating with the main adjustment chamber 26a. The measurement chamber 28 communicates with the auxiliary adjustment chamber 26b.

Furthermore, the sensor cell 22 includes a diffusion resistance adjustment chamber 30 provided between the gas introduction port 16 and the main adjustment chamber 26a within the laminated body 14, and which communicates with the gas introduction port 16.

More specifically, the laminated body 14 is constituted by five layers including a first substrate layer 32a, a second substrate layer 32b, a first solid electrolyte layer 34, a spacer layer 36, and a second solid electrolyte layer 38, which are stacked in this order from a lower side as viewed in the drawing.

Between a lower surface of the second solid electrolyte layer 38 and an upper surface of the first solid electrolyte layer 34 on a distal end side of the sensor element 20, the sensor cell 22 is equipped with the aforementioned preliminary space 17, the gas introduction port 16, a first diffusion rate control member 40a, the diffusion resistance adjustment chamber 30, a second diffusion rate control member 40b, the oxygen concentration adjustment chamber 26, a third diffusion rate control member 40c, and the measurement chamber 28. Further, a fourth diffusion rate control member 40d is provided between the main adjustment chamber 26a and the auxiliary adjustment chamber 26b that make up the oxygen concentration adjustment chamber 26.

The preliminary space 17, the gas introduction port 16, the first diffusion rate control member 40a, the diffusion resistance adjustment chamber 30, the second diffusion rate control member 40b, the main adjustment chamber 26a, the fourth diffusion rate control member 40d, the auxiliary adjustment chamber 26b, the third diffusion rate control member 40c, and the measurement chamber 28 are formed adjacent to each other in a manner communicating in this order. The portion from the gas introduction port 16 leading to the measurement chamber 28 is also referred to as a gas flow section.

The gas introduction port 16, the diffusion resistance adjustment chamber 30, the main adjustment chamber 26a, the auxiliary adjustment chamber 26b, and the measurement chamber 28 are internal spaces provided by hollowing out the spacer layer 36. Any of the diffusion resistance adjustment chamber 30, the main adjustment chamber 26a, the auxiliary adjustment chamber 26b, and the measurement chamber 28 is arranged in a manner so that respective upper parts thereof are defined by a lower surface of the second solid electrolyte layer 38, respective lower parts thereof are defined by an upper surface of the first solid electrolyte layer 34, and respective side parts thereof are defined by side surfaces of the spacer layer 36.

Any of the first diffusion rate control member 40a, the third diffusion rate control member 40c, and the fourth diffusion rate control member 40d of the sensor cell 22 is provided as two horizontally elongated slits (in which openings thereof have a longitudinal direction in a direction perpendicular to the drawing). The second diffusion rate control member 40b is provided as one horizontally elongated slit (in which an opening thereof has a longitudinal direction in a direction perpendicular to the drawing).

Further, a reference gas introduction space is disposed between an upper surface of the second substrate layer 32b and a lower surface of the first solid electrolyte layer 34, at a position that is farther from the distal end side than the gas flow section. The reference gas introduction space is a space formed between the upper first solid electrolyte layer 34 and the lower second substrate layer 32b. This space may be filled with a porous body. For example, oxygen or atmospheric air is introduced as a reference gas into the reference gas introduction space.

The preliminary space 17 and the gas introduction port 16 are locations that open with respect to the external space, and the gas to be measured is pumped into the sensor cell 22 from the external space through the preliminary space 17 and the gas introduction port 16. When the gas to be measured is introduced from the exterior of the sensor element 20 into the interior of the measurement chamber 28, due to pressure fluctuations of the gas to be measured in the external space (pulsations in the exhaust pressure, in the case that the gas to be measured is an exhaust gas of an automobile), the gas to be measured, which is rapidly pumped into the sensor element 20 from the preliminary space 17 and the gas introduction port 16, is not introduced directly into the measurement chamber 28, but rather, is introduced into the measurement chamber 28 after such fluctuations in the concentration of the gas to be measured are canceled by passing through the first diffusion rate control member 40a, the diffusion resistance adjustment chamber (buffer space) 30, the fourth diffusion rate control member 40d, and the third diffusion rate control member 40c. Consequently, the fluctuations in the concentration of the gas to be measured that is introduced into the measurement chamber 28 become almost negligible.

The first diffusion rate control member 40a of the sensor cell 22 is a location that imparts a predetermined diffusion resistance to the gas to be measured which is introduced from the gas introduction port 16 into the diffusion resistance adjustment chamber 30.

The second diffusion rate control member 40b of the sensor cell 22 is a location that imparts a predetermined diffusion resistance to the gas to be measured which is introduced from the diffusion resistance adjustment chamber 30 into the main adjustment chamber 26a.

The main adjustment chamber 26a is provided as a space for the purpose of adjusting an oxygen partial pressure within the gas to be measured that is introduced from the preliminary space 17 and the gas introduction port 16. The oxygen partial pressure is adjusted by operation of a later-described main pump cell 42.

The main pump cell 42 comprises an electrochemical pump cell (main electrochemical pumping cell), which is constituted by an inner side electrode 44, an outer side electrode 46, and an oxygen ion conductive solid electrolyte which is sandwiched between the two pump electrodes. The inner side electrode 44 is provided substantially over the entire surface of an upper surface of the first solid electrolyte layer 34, a lower surface of the second solid electrolyte layer 38, and the side surfaces of the spacer layer 36 that define the main adjustment chamber 26a. The outer side electrode 46 is provided in a region within the upper surface of the second solid electrolyte layer 38 corresponding to the inner side electrode 44.

The main pump cell 42 applies a first pump voltage Vp1 supplied from a first variable power source 48A for the sensor cell 22 which is provided externally of the sensor element 20, and by allowing a first pump current Ip1 to flow between the outer side electrode 46 and the inner side electrode 44, it is possible to pump oxygen inside the main adjustment chamber 26a into the external space, or alternatively, to pump oxygen in the external space into the main adjustment chamber 26a.

Further, the sensor cell 22 includes a first oxygen partial pressure detecting sensor cell 50A which is an electrochemical sensor cell. The first oxygen partial pressure detecting sensor cell 50A is constituted by the inner side electrode 44, a reference electrode 52 sandwiched between the first solid electrolyte layer 34 and an upper surface of the second substrate layer 32b, and an oxygen ion conductive solid electrolyte sandwiched between these electrodes. The reference electrode 52 is an electrode having a substantially rectangular shape as viewed in plan, which is made from a porous cermet that is the same as the material of the outer side electrode 46 and the like.

Further, around the periphery of the reference electrode 52, a reference gas introduction layer 54 is provided, which is made from porous alumina and is connected to the reference gas introduction space. More specifically, the reference gas in the reference gas introduction space is introduced to the surface of the reference electrode 52 via the reference gas introduction layer 54. The first oxygen partial pressure detecting sensor cell 50A generates a first electromotive force V1 between the inner side electrode 44 and the reference electrode 52, which is caused by the difference in oxygen concentration between the atmosphere inside the main adjustment chamber 26a and the reference gas in the reference gas introduction space.

The first electromotive force V1 generated in the first oxygen partial pressure detecting sensor cell 50A changes depending on the oxygen partial pressure of the atmosphere existing in the main adjustment chamber 26a. In accordance with the aforementioned first electromotive force V1, the sensor cell 22 feedback-controls the first variable power source 48A of the main pump cell 42. Consequently, the first pump voltage Vp1, which is applied by the first variable power source 48A to the main pump cell 42, can be controlled in accordance with the oxygen partial pressure of the atmosphere in the main adjustment chamber 26a.

The fourth diffusion rate control member 40d imparts a predetermined diffusion resistance to the gas to be measured, the oxygen concentration (oxygen partial pressure) of which is controlled by operation of the main pump cell 42 in the main adjustment chamber 26a, and is a location that guides the gas to be measured into the auxiliary adjustment chamber 26b.

The auxiliary adjustment chamber 26b is provided as a space for further carrying out adjustment of the oxygen partial pressure by a later-described auxiliary pump cell 56, with respect to the gas to be measured which is introduced through the fourth diffusion rate control member 40d, after the oxygen concentration (oxygen partial pressure) has been adjusted beforehand in the main adjustment chamber 26a. In accordance with this feature, the oxygen concentration inside the auxiliary adjustment chamber 26b can be kept constant with high accuracy, and therefore, the sensor cell 22 is made capable of measuring the NOx concentration with high accuracy.

The auxiliary pump cell 56 is an electrochemical pump cell, and is constituted by an auxiliary pump electrode 58, which is provided substantially over the entirety of the lower surface of the second solid electrolyte layer 38 and the upper surface of the first solid electrolyte layer 34 in facing relation to the auxiliary adjustment chamber 26b, the outer side electrode 46, and the second solid electrolyte layer 38.

Moreover, in the same manner as the inner side electrode 44, the auxiliary pump electrode 58 is also formed using a material that weakens the reduction capability with respect to the NOx component within the gas to be measured.

The auxiliary pump cell 56, by applying a desired second voltage Vp2 between the auxiliary pump electrode 58 and the outer side electrode 46, is capable of pumping out oxygen within the atmosphere inside the auxiliary adjustment chamber 26b into the external space.

Further, in order to control the oxygen partial pressure within the atmosphere inside the auxiliary adjustment chamber 26b, an electrochemical sensor cell, and more specifically, a second oxygen partial pressure detecting sensor cell 50B for controlling the auxiliary pump, is constituted by the auxiliary pump electrode 58, the reference electrode 52, the second solid electrolyte layer 38, the spacer layer 36, and the first solid electrolyte layer 34.

Moreover, the auxiliary pump cell 56 carries out pumping by a second variable power source 48B, the voltage of which is controlled based on a second electromotive force V2 detected by the second oxygen partial pressure detecting sensor cell 50B. Consequently, the oxygen partial pressure within the atmosphere in the auxiliary adjustment chamber 26b is controlled so as to become a low partial pressure that does not substantially influence the measurement of NOX.

Further, together therewith, a second pump current Ip2 of the auxiliary pump cell 56 is used so as to control the second electromotive force V2 of the second oxygen partial pressure detecting sensor cell 50B. More specifically, the second pump current Ip2 is input as a control signal to the second oxygen partial pressure detecting sensor cell 50B, and by controlling the second electromotive force V2, the gradient of the oxygen partial pressure within the gas to be measured, which is introduced through the fourth diffusion rate control member 40d into the auxiliary adjustment chamber 26b, is controlled so as to remain constant at all times.

Furthermore, if the first variable power source 48A of the main pump cell 42 is feedback-controlled in a manner so that the second pump current value Ip2 becomes constant, the accuracy of the oxygen partial pressure control within the auxiliary adjustment chamber 26b is further improved. When the sensor cell 22 is used as a NOx sensor, by the actions of the main pump cell 42 and the auxiliary pump cell 56, the oxygen concentration inside the auxiliary adjustment chamber 26b is maintained at a predetermined value with high accuracy for each of the respective conditions.

The third diffusion rate control member 40c imparts a predetermined diffusion resistance to the gas to be measured, the oxygen concentration (oxygen partial pressure) of which is controlled by operation of the auxiliary pump cell 56 in the auxiliary adjustment chamber 26b, and is a location that guides the gas to be measured into the measurement chamber 28.

In the sensor cell 22, measurement of the NOx concentration is primarily performed by operation of a measurement pump cell 60 provided in the measurement chamber 28. The measurement pump cell 60 is an electrochemical pump cell constituted by a measurement electrode 62, the outer side electrode 46, the second solid electrolyte layer 38, the spacer layer 36, and the first solid electrolyte layer 34. The measurement electrode 62 is provided, for example, directly on the upper surface of the first solid electrolyte layer 34 inside the measurement chamber 28, and is a porous cermet electrode made of a material whose reduction capability with respect to the NOx component within the gas to be measured is higher than that of the inner side electrode 44. The measurement electrode 62 also functions as a NOx reduction catalyst for reducing the NOx existing within the atmosphere above the measurement electrode 62.

The measurement pump cell 60 is capable of pumping out oxygen that is generated by the decomposition of nitrogen oxide within the atmosphere around the periphery of the measurement electrode 62 (inside the measurement chamber 28), and can detect the generated amount as a third pump current Ip3, and more specifically, as a sensor output (a first measurement pump current value Ip3) of the sensor cell 22.

Further, in order to detect the oxygen partial pressure around the periphery of the measurement electrode 62 (inside the measurement chamber 28), an electrochemical sensor cell, and more specifically, a third oxygen partial pressure detecting sensor cell 50C for controlling the measurement pump, is constituted by the first solid electrolyte layer 34, the measurement electrode 62, and the reference electrode 52. A third variable power source 48C is controlled based on a third electromotive force V3 detected by the third oxygen partial pressure detecting sensor cell 50C.

The gas to be measured, which is introduced into the auxiliary adjustment chamber 26b, reaches the measurement electrode 62 inside the measurement chamber 28 through the third diffusion rate control member 40c, under a condition in which the oxygen partial pressure is controlled. Nitrogen oxide existing within the gas to be measured around the periphery of the measurement electrode 62 is reduced to thereby generate oxygen.

Then, the generated oxygen is subjected to pumping by the measurement pump cell 60. At this time, a third voltage Vp3 of the third variable power source 48C is controlled in a manner so that the third electromotive force V3 detected by the third oxygen partial pressure detecting sensor cell 50C becomes constant. The amount of oxygen generated around the periphery of the measurement electrode 62 is proportional to the concentration of nitrogen oxide within the gas to be measured. Accordingly, the nitrogen oxide concentration within the gas to be measured can be calculated using the first measurement pump current Ip3 of the measurement pump cell 60. More specifically, the measurement pump cell 60 measures the concentration of a specified component (NO) within the measurement chamber 28.

Further, in the sensor cell 22, a heater (heat generating unit) 64 is formed in a manner of being sandwiched from above and below between the first substrate layer 32a and the second substrate layer 32b. The heater (heat generating unit) 64 generates heat by being supplied with power from the exterior through a non-illustrated heater electrode provided on a lower surface of the second substrate layer 32b. As a result of the heat generated by the heater (heat generating unit) 64, the oxygen ion conductivity of the solid electrolyte that constitutes the sensor cell 22 is enhanced.

The heater (heat generating unit) 64 is embedded over the entire region of the diffusion resistance adjustment chamber 30, the oxygen concentration adjustment chamber 26, and the measurement chamber 28, whereby a predetermined location of the sensor cell 22 can be heated and maintained at a predetermined temperature (for example 800° C.). Moreover, a heater insulating layer 66 made of alumina or the like is formed on the upper and lower surfaces of the heater (heat generating unit) 64, for the purpose of obtaining electrical insulation thereof from the first substrate layer 32a and the second substrate layer 32b.

The diffusion resistance adjustment chamber 30 also functions as a buffer space. More specifically, it is possible to cancel fluctuations in the concentration of the gas to be measured, which are caused by pressure fluctuations of the gas to be measured in the external space (pulsations in the exhaust pressure, in the case that the gas to be measured is an exhaust gas of an automobile).

Further, the sensor cell 22 includes an electrochemical oxygen detecting cell 70. The oxygen detecting cell 70 includes the second solid electrolyte layer 38, the spacer layer 36, the first solid electrolyte layer 34, the second substrate layer 32b, the outer side electrode 46, and the reference electrode 52. In accordance with the electromotive force Vr obtained by the oxygen detecting cell 70, it is possible to detect the oxygen partial pressure within the gas to be measured existing externally of the sensor element 20.

In addition, within the gas sensor 10, the first substrate layer 32a, the second substrate layer 32b, the first solid electrolyte layer 34, the spacer layer 36, and the second solid electrolyte layer 38 that constitute the laminated body 14 are each formed respectively by a ceramic layer 12.

Further, in the gas sensor 10, an upper layer 80 is formed by one of the ceramic layers 12 on an upper surface of the second solid electrolyte layer 38 in the laminated body 14, and in a similar manner, a lower layer 82 is formed by another of the ceramic layers 12 on a lower surface of the first substrate layer 32a in the laminated body 14. The main component of the ceramic layers 12, for example, is $ZrO_2$. It should be noted that, in addition to $ZrO_2$, the main component of the upper layer 80 and the lower layer 82 may also be $Al_2O_3$.

In addition, as shown in FIGS. 2A and 2B, in the gas sensor 10, a slit portion 100 connected to the external space is interposed between the ceramic layer 12 formed on the upper surface of the laminated body 14 (see FIG. 1) and the outer side electrode 46. More specifically, an upwardly recessed recess, and in particular, the slit portion 100 is formed at a portion facing toward the outer side electrode 46. As shown in FIG. 2B, the width of the slit portion 100 is the same as the width of the ceramic layers 12, and the slit portion 100 includes an opening (a left slit opening 102L) on a left side surface, and an opening (a right slit opening 102R) on a right side surface, and a continuous recess (ceiling) 104 is formed from the left slit opening 102L to the right slit opening 102R in covering relation to the outer side electrode 46. More specifically, the slit portion 100 discharges through the left slit opening 102L and the right slit opening 102R the oxygen that is pumped out through the inner side electrode 44 formed in the oxygen concentration adjustment chamber 26 (see FIG. 1).

Initially, as a premise, it is preferable that the slit portion 100, which serves as the oxygen pumping out section, make the gas diffusion resistance of the slit portion 100 which acts as an oxygen outlet be smaller than the gas diffusion resistance of the gas introduction port 16 which acts as an oxygen inlet, in a manner so that cracks or the like do not occur due to the pressure of the oxygen that is pumped from the oxygen concentration adjustment chamber 26. Consequently, in the gas sensor 10, in which the ceramic layers having a different main component respectively are laminated, oxygen can be efficiently discharged from the outer side electrode 46.

Further, when a non-combusted substance flows into the vacant chamber (the oxygen concentration adjustment chamber 26 or the like) from the gas introduction port 16, in order to cause the non-combusted substance to undergo combustion, there is a need for oxygen to be pumped in to an inner side electrode (the inner side electrode 44 or the like) which is disposed inside the vacant chamber, from the outer side electrode 46, by applying a voltage between the outer side electrode 46 and the inner side electrode. In this case, since the gas diffusion resistance of the slit portion 100, which is the oxygen inlet, is sufficiently small, pumping in of the oxygen can be efficiently carried out.

In this instance, a limit current measurement method is used as one means for quantitatively observing each of the respective gas diffusion resistances.

In general, the limit current value becomes larger as the diffusion resistance decreases (under a diffusion rate control condition). Accordingly, a magnitude relationship of the limit current value at a time of pumping in oxygen and pumping out oxygen between the inner side electrode 44 and the outer side electrode 46 is defined with the same applied voltage between the outer side electrode 46 and the inner side electrode 44, under the same oxygen concentration.

Stated otherwise, the area of the left slit opening 102L and the right slit opening 102R, and the distance from the outer side electrode 46 to the left slit opening 102L and the right slit opening 102R are designed, in a manner so that the limit current value realized by the oxygen, which is introduced from the slit portion 100 and is pumped in to the inner side electrode 44 from the outer side electrode 46, becomes greater than a limit current value realized by the oxygen, which is introduced from the gas introduction port 16 and pumped out to the outer side electrode 46 from the inner side electrode 44 in the interior of the oxygen concentration adjustment chamber 26.

A basic formula is as follows.

$$I = 4F/RT \cdot D_{O2} \cdot A/L \cdot C_{O2}$$

In the above formula, I is a limit current value, F is the Faraday constant, R is the gas constant, T is the temperature, $D_{O2}$ is the oxygen diffusion coefficient, A is an opening area of the left slit opening 102L and the right slit opening 102R, L is a distance from the left slit opening 102L and the right slit opening 102R to the outer side electrode 46, and $C_{O2}$ is the oxygen concentration.

In this instance, F/RT and $D_{O2}$ are constants. In the case that $C_{O2}$ is constant, the larger the opening area A (the gas introduction port 16, the left slit opening 102L, and the right slit opening 102R), and the shorter the depthwise length L from the left slit opening 102L and the right slit opening 102R to the outer side electrode 46 (the distance from the gas introduction port 16 to the inner side electrode 44 inside the oxygen concentration adjustment chamber 26, the distance from the left slit opening 102L and the right slit opening 102R to the outer side electrode 46), the larger the limit current value I becomes. Stated otherwise, the gas diffusion resistance becomes smaller.

Further, the gas diffusion resistance of the slit portion 100 which acts as the pumping outlet is made smaller than that of the gas introduction port 16 which acts as the inlet, in a manner so that cracks or the like do not occur in the slit portion 100, which is the oxygen pumping out section, due to the pressure of the oxygen that is pumped from the oxygen concentration adjustment chamber 26.

Further, when a non-combusted substance flows into the vacant chamber (the oxygen concentration adjustment chamber 26 or the like) from the gas introduction port 16, in order to cause the non-combusted substance to undergo combustion, there is a need for oxygen to be pumped in from the outer side electrode, by applying a voltage from the outer side electrode 46 to an inner side electrode (the inner side electrode 44 or the like) which is disposed inside the vacant chamber. In this case, the gas diffusion resistance of the slit portion 100, which is the oxygen inlet, is made sufficiently small.

For this purpose, the area of the gas introduction port 16, the left slit opening 102L, and the right slit opening 102R, the distance from the gas introduction port 16 to the inner side electrode 44 inside the oxygen concentration adjustment chamber 26, and the distance from the left slit opening 102L and the right slit opening 102R to the outer side electrode 46 are adjusted.

Next, a description will be given concerning a further preferable exemplary configuration of the gas sensor 10.

Initially, a first exemplary configuration has basically the same configuration as the gas sensor according to the present embodiment described above, but differs therefrom in the following points.

More specifically, when the diffusion resistance from the gas introduction port 16 until reaching the inner side electrode 44 is designated as R1, and the diffusion resistance from the slit portion 100 until reaching the outer side electrode 46 is designated as R2, the diffusion resistance R2 is preferably less than or equal to 1.2 times, and more preferably, is less than or equal to 0.5 times the diffusion resistance R1.

In the case that the diffusion resistance R2 is greater than 1.2 times the diffusion resistance R1, there is a concern that cracks may occur due to the pressure of the oxygen on the slit portion, at a time when the oxygen is discharged from the inner side electrode to the outer side electrode. Further, in the case that a non-combusted substance flows into the vacant chamber (to the inner side electrode 44 or the like) from the gas introduction port 16, cases may also occur in which it becomes impossible to sufficiently pump in oxygen for causing the non-combusted substance to undergo combustion.

In a second exemplary configuration, as shown in FIGS. 3A and 3B, within the slit portion 100, a space other than the outer side electrode 46 may be filled with a porous material 110. Owing to this feature, the mechanical strength of the slit portion 100 can be increased, without increasing the gas diffusion resistance of the slit portion 100 insofar as possible.

In a third exemplary configuration, as shown in FIGS. 4A and 4B, a hole 111 may be formed in the ceiling of the outer side electrode 46, in order to maintain strength, and a relationship in which a limit current value A2 is greater than a limit current value A1 (A2>A1).

In a fourth exemplary configuration, as shown in FIGS. 5A and 5B, a distal end portion of the gas sensor 10 may be covered with a porous layer 112. Owing to this feature, thermal shocks caused by coming into contact with water or the like can be alleviated by the porous layer, and for example, the useful life of the functional portion can be extended.

Figure 6A:
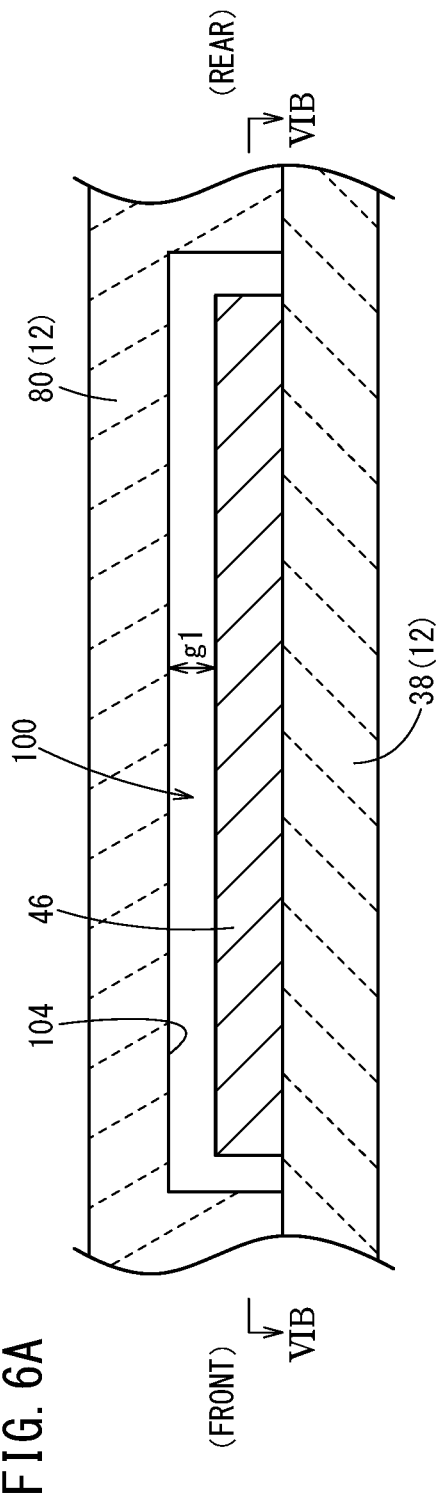
FIG. 6A is a vertical cross-sectional view sectioned in a front-rear direction and showing a fifth exemplary configuration of the gas sensor.

In a fifth exemplary embodiment, as shown in FIG. 6A, within the slit portion 100, a first gap g1 formed between an upper surface of the outer side electrode 46 and the ceiling (recess) 104 of the slit portion 100 preferably lies within a range of from 5 to 50 μm.

If the first gap g1 is less than 5 μm, the gas diffusion resistance of the first gap g1 becomes larger, and along therewith, the oxygen pressure due to pumping of the oxygen also becomes greater. Therefore, a concern arises in that cracks may occur in the slit portion 100 or the like. Further, in the case that a non-combusted substance flows into the vacant chamber (the oxygen concentration adjustment chamber 26 or the like) from the gas introduction port 16, cases may also occur in which it becomes impossible to sufficiently pump in oxygen for causing the non-combusted substance to undergo combustion. Conversely, if the first gap g1 exceeds 50 μm, the strength of the slit portion 100 may decrease, and the rate at which cracks are generated due to vibration, impacts, or the like may increase.

Figure 6B:
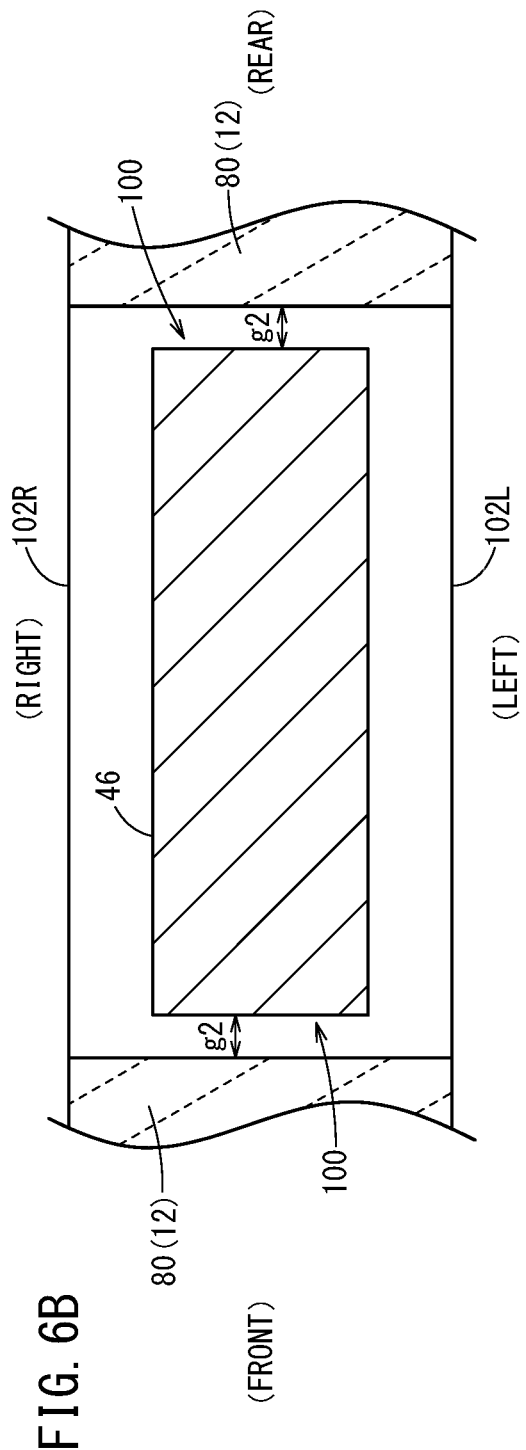
FIG. 6B is a vertical cross-sectional view taken along line VB-VB in FIG. 6A.

In the fifth exemplary embodiment, as shown in FIG. 6B, within the slit portion 100, a second gap g2 formed in at least one of between a front end of the outer side electrode 46 and the slit portion 100, and between an rear end of the outer side electrode 46 and the slit portion 100 preferably lies within a range of from 5 to 500 μm.

If the second gap g2 is less than 5 μm, the gas diffusion resistance of the second gap g2 becomes larger, and along therewith, the oxygen pressure due to pumping of the oxygen also becomes greater. Therefore, a concern arises in that cracks may occur in the slit portion 100 or the like. Further, in the case that a non-combusted substance flows into the vacant chamber (the oxygen concentration adjustment chamber 26 or the like) from the gas introduction port 16, cases may also occur in which it becomes impossible to sufficiently pump in oxygen for causing the non-combusted substance to undergo combustion. Conversely, if the second gap g2 exceeds 500 μm, the strength of the slit portion 100 may decrease, and the rate at which cracks are generated due to vibration, impacts, or the like may increase.

In a sixth exemplary embodiment, as shown in FIGS. 6B, the slit portion 100 may include at least two slit openings (the left slit opening 102L and the right slit opening 102R), and a total area (Aa+Ab) of each of the slit openings 102L (an area Aa) and 102R (an area Ab) (refer to FIG. 7B) may be greater than an area Ac of the gas introduction port 16 (refer to FIG. 7A) in which the area of the first diffusion rate control member 40a is included.

In a seventh exemplary embodiment, as shown in FIGS. 8A and 8B, the slit portion 100 may include at least two slit openings (the left slit opening 102L and the right slit opening 102R), and a total (g3a+g3b) of a shortest distance (a third gap g3a and a third gap g3b) from each of the slit openings 102L and 102R to the outer side electrode 46 may be shorter than a shortest distance La (refer to FIG. 7A) from the gas introduction port 16 to a distal end of the oxygen concentration adjustment chamber 26.

The gas sensor according to the present invention is not limited to the embodiments described above, and it is a matter of course that various configurations could be adopted therein without deviating from the essence and gist of the present invention.

More specifically, although it is preferable for the main material of the above-described ceramic layers 12 to be $Al_2O_3$, in the case that another type of ceramic layer is laminated, any material may be used, as long as the difference in thermal expansion thereof from the aforementioned ceramic layers 12 lies within a range of $1.9 \times 10^{-6}$ to $3.6 \times 10^{-6}$ [/K], and the thermal conductivity thereof is higher than that of $ZrO_2$. For example, spinel, mullite, magnesia or the like can be adopted for such a material.

What is claimed is:

1. A gas sensor, comprising a sensor element, the sensor element comprising:
   a laminated body having at least two ceramic layers laminated thereon and having at least one gas introduction port, and at least one internal vacancy; and
   an outer side electrode formed on the laminated body, and provided in order to discharge oxygen from the at least one internal vacancy,
   wherein a hollow slit portion connected to an external space at a side of the laminated body, and which is formed in covering relation to the outer side electrode, is interposed between the outer side electrode and one ceramic layer of the at least two ceramic layers, and
   wherein a hole is formed in the one ceramic layer to allow the slit portion and the external space to communicate with each other.

2. The gas sensor according to claim 1, wherein:
   the at least one internal vacancy includes an inner side electrode provided in order to discharge oxygen from the at least one internal vacancy; and when a diffusion resistance from the at least one gas introduction port until reaching the inner side electrode is designated as R1, and a diffusion resistance from the slit portion until reaching the outer side electrode is designated as R2, the diffusion resistance R2 is greater than 0 times and less than or equal to 1.2 times the diffusion resistance R1.

3. The gas sensor according to claim 2, wherein the diffusion resistance R2 is greater than 0 times and less than or equal to 0.5 times the diffusion resistance R1.

4. The gas sensor according to claim 1, wherein when a diffusion resistance from the at least one gas introduction port until reaching an inner side electrode is designated as R1, and a diffusion resistance from the slit portion until reaching the outer side electrode is designated as R2, the diffusion resistance R1 is less than the diffusion resistance R2.

5. The gas sensor according to claim 1, wherein, within the slit portion, a first gap is formed between an upper surface of the outer side electrode and a ceiling of the slit portion, and the first gap lies within a range of from 5 to 50 μm.

6. The gas sensor according to claim 1, wherein, within the slit portion, a second gap is formed in at least one of between a front end of the outer side electrode and a front end portion of the slit portion, and between a rear end of the outer side electrode and a rear end portion of the slit portion, and the second gap lies within a range of from 5 to 500 μm.

7. The gas sensor according to claim 1, wherein the slit portion includes at least two slit openings, and a total area of each of the at least two slit openings is greater than an area of the at least one gas introduction port.

8. The gas sensor according to claim 1, wherein the slit portion includes at least two slit openings, and a total of a shortest distance from each of the at least two slit openings to the outer side electrode is shorter than a shortest distance from the at least one gas introduction port to a distal end of the at least one internal vacancy.

9. The gas sensor according to claim 1,
wherein each of the at least two ceramic layers is formed from an oxygen-ion conducting solid electrolyte,
wherein the slit portion has a front end portion and a rear end portion in a longitudinal direction of the gas sensor, a left side portion and a right side portion in a lateral direction of the gas sensor, and a ceiling portion, and
wherein the left side portion and the right side portion of the slit portion are exposed to the external space.

* * * * *